US011429779B2

(12) United States Patent
Li et al.

(10) Patent No.: US 11,429,779 B2
(45) Date of Patent: Aug. 30, 2022

(54) METHOD AND SYSTEM FOR INTELLIGENTLY SUGGESTING PARAPHRASES

(71) Applicant: MICROSOFT TECHNOLOGY LICENSING, LLC, Redmond, WA (US)

(72) Inventors: Zhang Li, Seattle, WA (US); Domenic Joseph Cipollone, Montgomery, OH (US); Maria Isabel Carpenter, Snohomish, WA (US); Juhi Amitkumar Naik, Bellevue, WA (US); Susan Michele Hendrich, Kirkland, WA (US); Michael Wilson Daniels, Redmond, WA (US); William Brennan Dolan, Kirkland, WA (US); Christopher Brian Quirk, Seattle, WA (US); Christopher John Brockett, Bellevue, WA (US); Alice Yingming Lai, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 491 days.

(21) Appl. No.: 16/459,576

(22) Filed: Jul. 1, 2019

(65) Prior Publication Data
US 2021/0004432 A1  Jan. 7, 2021

(51) Int. Cl.
  *G06F 40/166* (2020.01)
  *G06F 3/0482* (2013.01)
  (Continued)

(52) U.S. Cl.
  CPC .......... *G06F 40/166* (2020.01); *G06F 3/0482* (2013.01); *G06F 40/295* (2020.01); *G06F 40/47* (2020.01); *G06K 9/6263* (2013.01)

(58) Field of Classification Search
  CPC .... G06F 40/166; G06F 3/0482; G06F 40/295; G06F 40/47; G06F 40/30; G06K 9/6263
  (Continued)

(56) References Cited

U.S. PATENT DOCUMENTS 7,149,970 B1 * 12/2006 Pratley .................... G10L 15/22
                                                    715/257
9,639,522 B2   5/2017 Dogrultan et al.

* cited by examiner

*Primary Examiner* — Thierry L Pham
(74) *Attorney, Agent, or Firm* — NovoTechIP International PLLC

(57) ABSTRACT

A method and system for providing replacement text segments for a given text segment may include receiving a request to provide the replacement text segment for the text segment in the document, examining a content characteristic of the document, and examining at least one of user-specific information, organization-specific information, or non-linguistic features of the document, before identifying at least one replacement text segment for the text segment, via a machine translation system, based on the content characteristic of the document and at least one of the user-specific information, the organization-specific information, or the non-linguistic features of the document. The method and system may include providing the identified replacement text segment for display to a user, receiving an input indicating a user's selection of the identified replacement text segment, and upon receiving the input, replacing the text segment in the document with the identified replacement text segment.

20 Claims, 12 Drawing Sheets

(51) Int. Cl.
*G06K 9/62* (2022.01)
*G06F 40/47* (2020.01)
*G06F 40/295* (2020.01)

(58) Field of Classification Search
USPC .......................................................... 704/9
See application file for complete search history.

METHOD AND SYSTEM FOR INTELLIGENTLY SUGGESTING PARAPHRASES

TECHNICAL FIELD

This disclosure relates generally to intelligent suggestion of content rewrites, and, more particularly, to a method of and system for intelligently identifying and suggesting replacement text segments for contents by utilizing user feedback.

BACKGROUND

Computer users often use various content creation applications to create textual content. For example, users may utilize an application to write an email, prepare an essay, document their work, prepare a presentation and the like. Often during the writing process, a person may be uncertain of the right term to use or may desire to use different terminology.

Some current applications provide mechanisms by which a user can determine synonyms for a single word used in the document and choose to replace the word with the synonym. This, however, has the technical problem of being limited to one or two words and often involves use of a dictionary where the process does not take into account other information from the document. As such, the suggested words may not always be the most appropriate to use for the document.

Hence, there is a need for improved systems and methods of intelligently identifying and suggesting rewrites for text segments.

SUMMARY

In one general aspect, the instant application describes a data processing system having a processor and a memory in communication with the processor wherein the memory stores executable instructions that, when executed by the processor, cause the data processing system to perform multiple functions. The functions may include receiving a request to provide the replacement text segment for the text segment in the document, examining a content characteristic of the document, and examining at least one of user-specific information, organization-specific information, or non-linguistic features of the document, before identifying at least one replacement text segment for the text segment, via a machine translation system, based on the content characteristic of the document and at least one of the user-specific information, the organization-specific information, or the non-linguistic features of the document. The functions may also include providing the identified replacement text segment for display to a user, receiving an input indicating a user's selection of the identified replacement text segment, and upon receiving the input, replacing the text segment in the document with the identified replacement text segment.

In yet another general aspect, the instant application describes a method for providing data imbalance detection and validation for a trained a ML model. The method may include receiving a request to provide the replacement text segment for the text segment in the document, examining a content characteristic of the document, and examining at least one of user-specific information, organization-specific information, or non-linguistic features of the document, before identifying at least one replacement text segment for the text segment, via a machine translation system, based on the content characteristic of the document and at least one of the user-specific information, the organization-specific information, or the non-linguistic features of the document. The method may also include providing the identified replacement text segment for display to a user, receiving an input indicating a user's selection of the identified replacement text segment, and upon receiving the input, replacing the text segment in the document with the identified replacement text segment.

In a further general aspect, the instant application describes a non-transitory computer readable medium on which are stored instructions that when executed cause a programmable device to receive a request to provide the replacement text segment for the text segment in the document, examine a content characteristic of the document, and examine at least one of user-specific information, organization-specific information, or non-linguistic features of the document, before identifying at least one replacement text segment for the text segment, via a machine translation system, based on the content characteristic of the document and at least one of the user-specific information, the organization-specific information, or the non-linguistic features of the document. The stored instructions when executed may also cause the programmable device to provide the identified replacement text segment for display to a user, receive an input indicating a user's selection of the identified replacement text segment, and upon receiving the input, replace the text segment in the document with the identified replacement text segment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
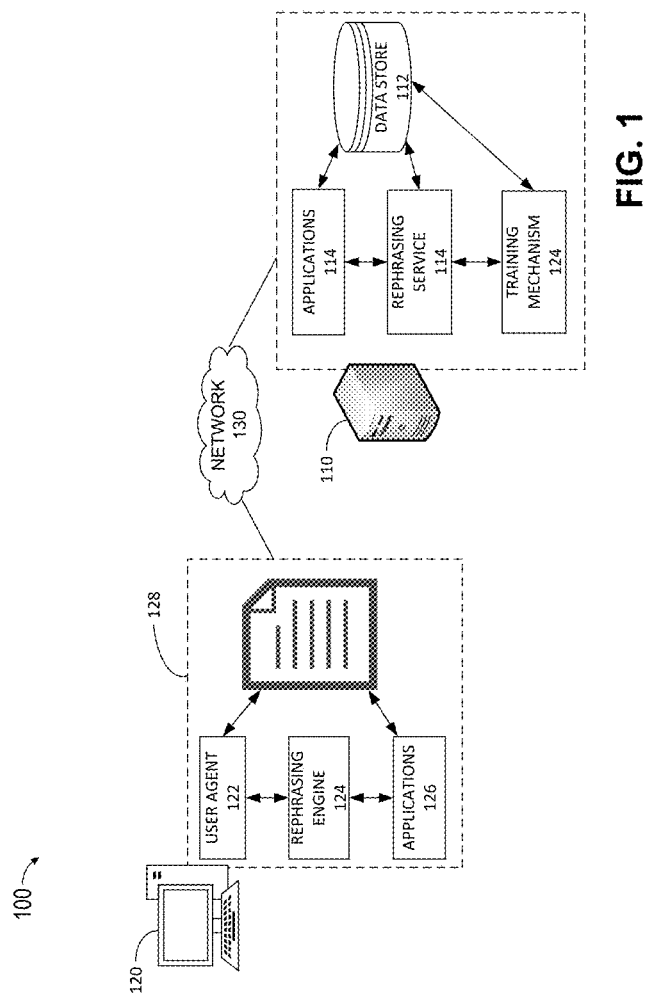
FIG. 1 depicts an example system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Providing suggestions for rewriting of text segments in documents can be useful in several different ways. The suggestions can be used by users to change the writing style, to avoid repetitive phrases, and to improve the quality of the written material (for example when a more appropriate text segment is available for use). However, currently used rephrasing mechanisms often have the technical problem of being limited to one or two words or to simply correcting grammar or spelling errors. Moreover, these mechanisms do not take into account other information from the document such as the remaining content of the document, the context of the selected text segment within the document, the user's history, and/or other non-linguistic features of the document and/or user. Thus, the suggestions provided are limited to one or two words and/or do not provide suggestions when no grammar or spelling error is found in a text segment. Furthermore, because additional information from the user and/or document is not taken into account, the suggestions provided may not always be the most appropriate suggestions.

To address these technical problems and more, in an example, this description provides a technical solution used for intelligently identifying and suggesting rewrites for content by utilizing, among other things, user feedback. To do so, techniques may be used to receive a request to provide suggestions for rewriting a selected text segment. Upon receiving the request, the text segment may be examined along with one or more of remaining content of the document, context, formatting and other characteristics of the document, in addition to user-specific history and information, and/or non-linguistic features. The examined information may be used to provide suggested rewrites for the selected text segment. In one implementation, the suggested rewrites are displayed in a user interface alongside the document to enable the user to view and choose from them conveniently. Additionally, techniques may be used to receive feedback from the user and utilize the feedback to improve machine-learning (ML) models used to provide the suggested rewrites. The feedback may be explicit, for example, when a user chooses to report a suggestion as offensive, not relevant and/or inaccurate. Furthermore, feedback may be obtained as part of the process based on user selection of the suggested rewrites. For example, the application may transmit information about which suggestion was selected by a user to a data store to use for ongoing training of the ML model. This type of feedback may be anonymized and processed to ensure it is privacy compliant. As a result, the technical solution provides an improved method of providing relevant replacement text segment suggestions for content by allowing a user to easily review and select intelligently suggested rewrites of text segments.

As will be understood by persons of skill in the art upon reading this disclosure, benefits and advantages provided by such implementations can include, but are not limited to, a technical solution to the technical problems of inefficient, inadequate, and/or inaccurate suggestions for rewriting text segments. Technical solutions and implementations provided herein optimize the process of providing alternative text segments for use in a document by allowing the user to select longer text segments (e.g. as opposed to one or two words) if desired, and providing an easily accessible user interface element which contains a list of intelligently suggested rewrites that not only consider grammar and spelling of the text segment but also alternative ways of writing the text segment based on multiple factors. This may eliminate the need for the user to come up with their own alternative way of rewriting text segments, and yet provide the user an opportunity to be the decision maker as to which text segment is the most appropriate for the document, thus increasing accuracy and relevancy. The benefits provided by these technology-based solutions yield more user-friendly applications, increased accuracy and increased system and user efficiency.

As a general matter, the methods and systems described herein may include, or otherwise make use of, a machine-trained model to identify contents related to a text. Machine learning (ML) generally involves various algorithms that a computer can automatically learn over time. The foundation of these algorithms is generally built on mathematics and statistics that can be employed to predict events, classify entities, diagnose problems, and model function approximations. As an example, a system can be trained using data generated by a ML model in order to identify patterns in user activity, determine associations between various words and contents (e.g., icons, images, or emoticons) and/or identify suggested contents that relate to a text entered by a given user. Such determination may be made following the accumulation, review, and/or analysis of user data from a large number of users over time, that may be configured to provide the ML algorithm (MLA) with an initial or ongoing training set. In addition, in some implementations, a user device can be configured to transmit data captured locally during use of relevant application(s) to the cloud or the local ML program and provide supplemental training data that can serve to fine-tune or increase the effectiveness of the MLA. The supplemental data can also be used to facilitate identification of contents and/or to increase the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The generation of this ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying ML algorithms may be trained, such as, but not limited to, decision trees, random decision forests, neural networks, deep learning (for example, convolutional neural networks), support vector machines, regression (for example, support vector regression, Bayesian linear regression, or Gaussian process regression). As another example, size or complexity of a model may be varied between different ML models, such as a maximum depth for decision trees, or a number and/or size of hidden layers in a convolutional neural network. As another example, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

The training data may be continually updated, and one or more of the models used by the system can be revised or regenerated to reflect the updates to the training data. Over time, the training system (whether stored remotely, locally, or both) can be configured to receive and accumulate more and more training data items, thereby increasing the amount and variety of training data available for ML model training, resulting in increased accuracy, effectiveness, and robustness of trained ML models.

FIG. 1 illustrates an example system 100, upon which aspects of this disclosure may be implemented. The system 100 may include a sever 110 which may be connected to or include a data store 112 which may function as a repository in which documents and/or data sets relating to training models for providing intelligent rephrasing may be stored may be stored. The server 110 may operate as a shared resource server located at an enterprise accessible by various computer client devices such as client device 120. The server may also operate as a cloud-based server for offering global rephrasing services.

The server 110 may include and/or execute a rephrasing service 114 which may provide intelligent replacement text segment suggestions within an enterprise and/or globally for a group of users. The rephrasing service 114 may operate to examine a selected text segment, remaining content of the document, along with context and non-linguistic features of the document to intelligently suggest one or more replacement text segment options. In one implementation, the rephrasing service is a cloud-based service. The rephrasing service may be provided by one or more rephasing ML models.

Each of the models used as part of the rephrasing service may be trained by a training mechanism 124. The training mechanism 124 may use training datasets stored in the data store 112 to provide initial and ongoing training for each of the model(s). In one implementation, the training mechanism 124 may use labeled training data from the data store 112 (e.g., stored user input data) to train each of the model(s) via deep neural networks models. The initial training may be performed in an offline stage.

The server 110 may also include or be connected to one or more online applications 116 that provide access to or enable creation and/or editing of one or more documents. The client device 120 may be connected to the server 110 via a network 130. The network 110 may be a wired or wireless network(s) or a combination of wired and wireless networks that connect one or more elements of the system 100. The client device 120 may be a personal or handheld computing device having or being connected to input/output elements that enable a user to interact with an electronic document 128 on the client device 120. Examples of suitable client devices 120 include but are not limited to personal computers, desktop computers, laptop computers, mobile telephones; smart phones; tablets; phablets; smart watches; wearable computers; gaming devices/computers; televisions; and the like. The internal hardware structure of a client device is discussed in greater detail in regard to FIGS. 5 and 6.

The client device 120 may include one or more applications 126. Each application 126 may be a computer program executed on the client device that configures the device to be responsive to user input to allow a user to interactively view, generate and/or edit the electronic document 128. The electronic document can include any type of data, such as text (e.g., alphabets, numbers, symbols), emoticons, still images, video and audio. The application 126 may process the electronic document, in response to user input through an input device, to create and/or modify the content of the electronic document, by displaying or otherwise presenting display data, such as a graphical user interface which includes the content of the electronic document to the user. Examples of suitable applications include, but are not limited to, a word processing application, a presentation application, a note taking application, a text editing application, an email application, a spreadsheet application, a desktop publishing application, and a communications application.

In some examples, applications used to create, modify and/or view content of an electronic document may be online applications such as applications 116 that are run on the server 110 and provided via an online service as described above. In one implementation, web applications may communicate via the network 130 with a user agent 122, such as a browser, executing on the client device 120. The user agent 122 may provide a user interface that allows the user to interact with application content and electronic documents stored in the data store 112. The user interface may be displayed on a display device of the client device 120 by utilizing for example the user agent 122. In some examples, the user agent 122 may be a dedicated client application that provides a user interface and access to electronic documents stored in the data store 112. In other examples, applications used to create, modify and/or view content of an electronic document may be local applications such as the applications 126 that are stored and executed on the client device 120, and provide a user interface that allows the user to interact with application content and electronic document 128.

Figure 2A:
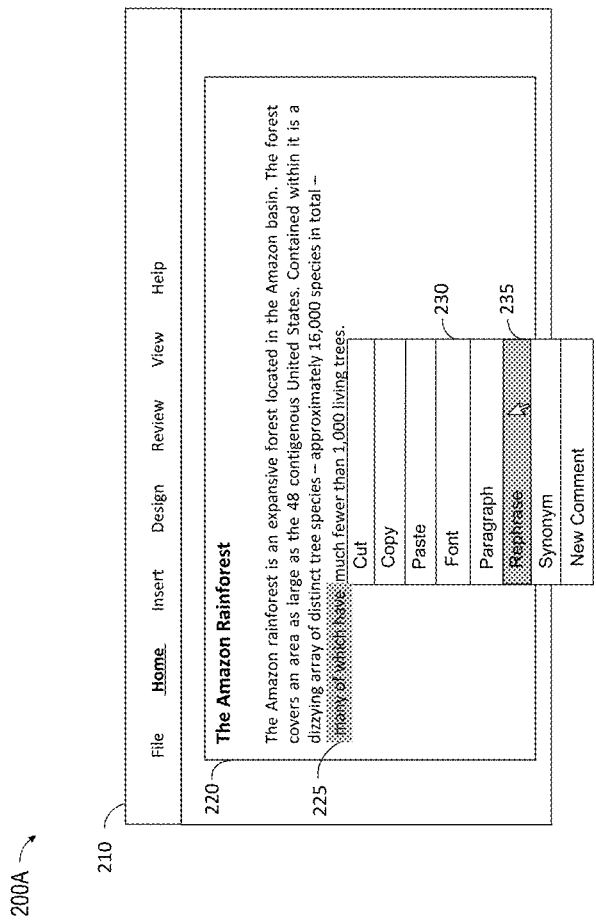
FIG. 2A-2E are example graphical user interface (GUI) screens for allowing a user to request and receive suggested replacement text segments for a selected text segment.

FIG. 2A-2E are example GUI screens for allowing a user to request and receive suggested replacement text segments for a selected text segment. FIG. 2A is an example GUI screen 200A of a word processing application (e.g., Microsoft Word®) displaying an example document. GUI screen 200A may include a toolbar menu 210 containing various tabs each of which may provide multiple user interface (UI) elements for performing various tasks. For example, the toolbar menu 210 may provide options for the user to perform one or more tasks to create or edit the document. Screen 200A may also contain a contents' pane 220 for displaying the contents of the document. The contents may be displayed to the user for viewing and/or editing purposes and may be created by the user. For example, the user may utilize an input device (e.g., a keyboard) to insert input such as text into the contents pane 220.

As the user creates or edits the contents of the contents pane 220, a UI element may be provided for transmitting a request to receive suggestions for replacing a selected text segment of the contents with an alternative text segment. A selected text segment can be any portion of the textual contents of the document and may include one or more words, sentences or paragraphs. The textual contents may include any type of alphanumerical text (e.g., words and numbers in one or more languages). Thus, a text segment need not correspond to a grammatical unit as commonly understood (such as a noun phrase, or a verb phrase), but can be any string of characters of any length. The text segment may also include a text having no content and thus having zero length. In one implementation, a text segment may also include known symbols, emoticons, gifs, animations, and the like. The UI element may be any menu option that can be used to indicate a request by the user. In one implementation, the UI element is provided via the context menu 230. When the user utilizes an input/output device such as a mouse to select a portion of the contents of the contents pane 220 such as the portion 225, certain user inputs (e.g., right clicking the mouse) may result in the display of the context menu 230. It should be noted that this is only an example method of initiating the display of UI element for invoking suggested replacement text segments. Many other methods of selecting a portion of the contents pane and initiating the display of a UI element for invoking suggested replacement text segments are possible. For example, a menu option may be provided as part of the toolbar 210 for invoking suggested replacement text segments.

Figure 2B:
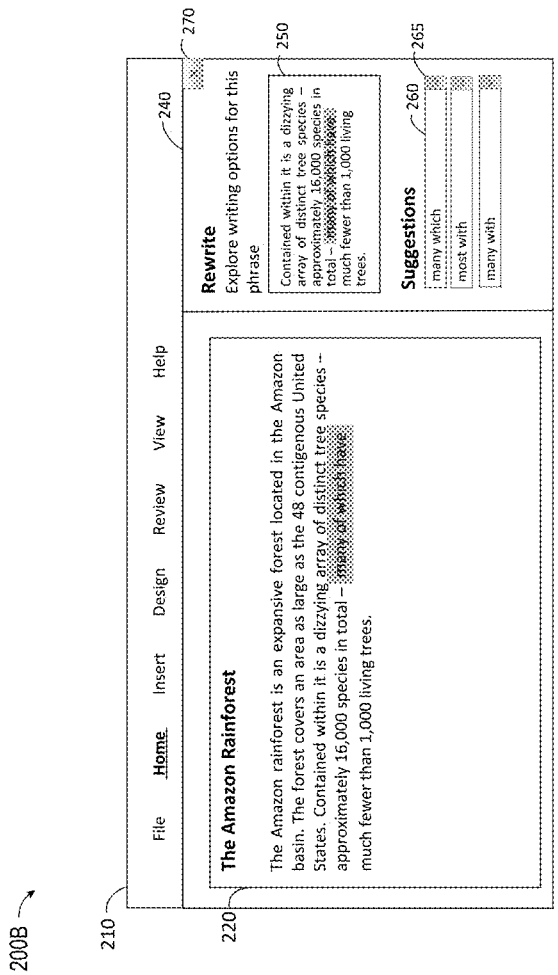

Along with many different options for editing the document, the context menu 230 may also provide a menu option 235 for invoking a display of suggested replacement text segments for the selected text segment 225. Once menu option 235 is selected, a rewrite pane 240, such as the one displayed in FIG. 2B, may be displayed alongside the contents pane 220 to provide suggested rewrites for the selected text segment. FIG. 2B depicts an example GUI screen 200B for presenting the results of a rephrasing operation to the user in a separate portion of the UI. Displaying a separate rewrite pane 240 alongside the contents pane may assist the user to check for and approve suggested replacement text segments as the user is working on the document. In this manner, the user can review the suggested replacement text segments within the context of the whole document to determine if a rewrite is appropriate. For example, the user may be able to determine whether the rewrite fits the style of the previous or next paragraphs. However, although shown as a separate pane in screen 200B, it should be noted that other UI configurations may be utilized to display the suggested replacement text segments. For example, a pop-up menu may be used, in one implementation. Additionally, although the rewrite pane 240 is shown as being located adjacent to and on the right side of the GUI screen 200B, the rewrite pane may be located anywhere within the GUI screen. Any other method for displaying the rewrite pane simultaneously on the same screen as the content pane may be utilized.

Rewrite pane 240 may display a UI element such as the box 250 for displaying the most relevant portion of the contents. For example, the box 250 may display the sentence containing the selected text segment. This may allow the user to focus on the most relevant portion of the document when determining which suggested replacement text segment to select. In one example, the box 250 may be scrollable and may include one or more paragraphs from the document, thus enabling the user to scroll up and down to other paragraphs. In one implementation, the box 250 may also enable the user to change the selected text segment by for example expanding the selected text segment to include more words or reducing the size of the selected text segment by one or more words to see how the suggested rephases change. In one implementation, the box 250 can be used to deselect the selected text segment and/or select another text segment.

Once a text segment has been selected in the contents pane 220 and/or box 250, the application may run a local rephrasing engine or may send a request to a rephrasing service to provide suggested replacement text segments for the selected text segment. In response, the application may receive a list of suggested replacement text segments 260 which may be displayed in the rewrite pane 240 for easy access and review. For example, for the selected text segment "many of which have", three suggestions may be provided which include "many which", "most with", and "many with". In an implementation, if none of the suggested replacement text segments seem appropriate to the user, a UI element may be provided for requesting the display of additional suggested replacement text segments.

Figure 2C:
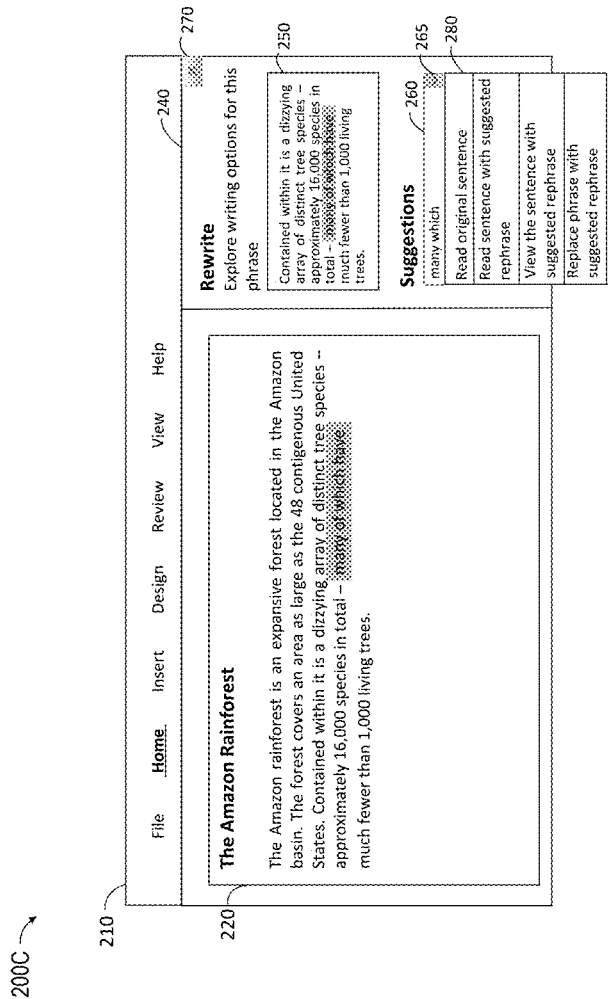

Each of the suggested replacement text segments 260 may be presented as a UI element (e.g., a menu option) for selection and/or further processing. In one implementation, each suggested replacement text segment 260 may be displayed with a dropdown menu 265. Selecting (e.g., clicking on) the dropdown menu 265 may cause a menu 280 to be displayed, as illustrated in FIG. 2C. FIG. 2C depicts an example GUI screen 200C for presenting the dropdown menu 280 of a suggested replacement text segment 260. The menu 280 may include multiple menu options relating to the suggested replacement text segment. In one implementation, these options include: read original sentence for presenting an audio reading of the original sentence and read sentence with the selected replacement text segment for presenting an audio reading of the sentence with the selected replacement text segment. This may enable the user to hear the difference between the two sentences to make a more informed decision about which phrase is more appropriate for the sentence. The menu 280 may also include an option for viewing the sentence with the suggested replacement text segment which may temporarily replace the selected text segment in the contents pane 220 with the suggested replacement text segment to enable the user to observe how the selected replacement text segment would change the sentence. Additionally, the menu 280 may include an option for replacing the selected text segment with the suggested replacement text segment which may result in permanent replacement of the selected text segment.

Figure 2D:
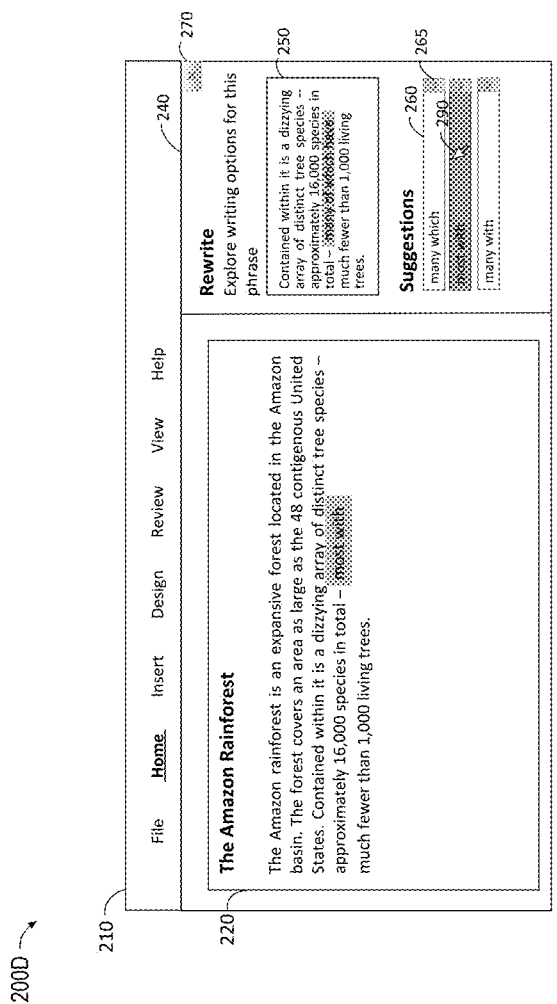

FIG. 2D depicts an example GUI screen 200D for providing an additional mechanism via which the selected text segment can be temporarily replaced by the suggested replacement text segment. In one implementation, hovering a cursor 290 over a suggested rephase 260 may cause the suggested replacement text segment to temporarily replace the selected text segment in the contents pane 220 to allow the user to observer and determine how the sentence would look and read with the suggested replacement text segment. This may enable the user to make a better-informed decision about which suggested replacement text segment to select. Once the user has selected a suggested replacement text segment, he/she may click on the selected replacement text segment to permanently replace the selected text segment with the selected suggestion. This may be achieved by using an input/output device (e.g., a mouse) to click on the selected suggestion or by clicking on the option provided in the dropdown menu 280 (as shown in FIG. 2C).

Figure 2E:
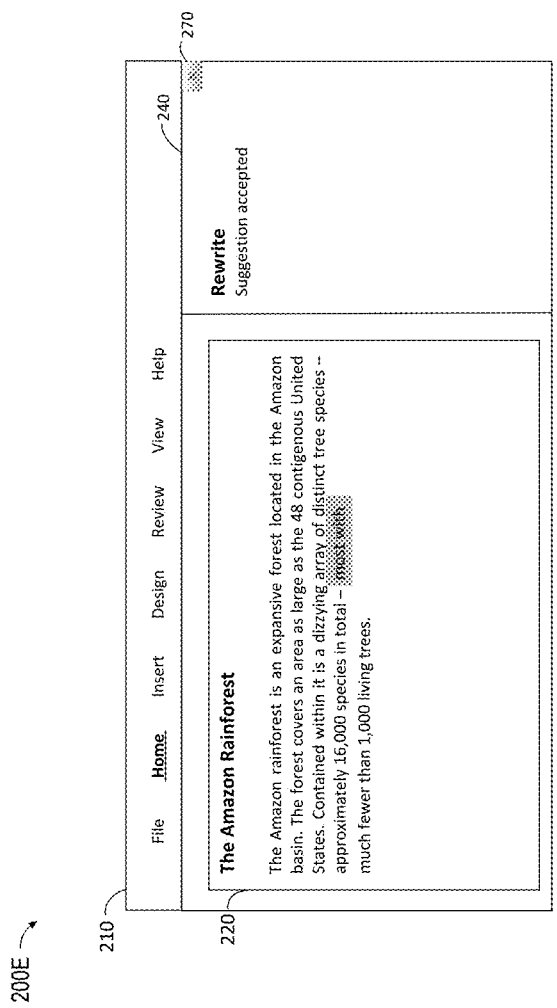

Once a selection has been made, the selected suggestion may replace the selected phrase in the contents pane 220 and the list of suggestions may disappear from the rewrite pane 240, as shown in FIG. 2E which depicts an example GUI screen 200E for displaying the rewrite pane once a selection has been made. As illustrated, the rewrite pane 240 of screen 200E simply states that the suggestion was accepted. At this point, the user may choose to close the rewrite pane 240 by utilizing the UI element 270 or may decide to select another text segment for rephrasing.

The application providing the rephase functionalities may collect information from the document and/or the user as the user interacts with the suggested replacement text segments to better train the ML models used in providing suggested replacement text segments. For example, the application may collect information relating to which one of the suggested replacement text segments was selected by the user. To ensure that context is taken into account, when using the information, the sentence structure and style may also be collected. Additionally, other information about the document and/or the user may be collected. For example, information about the type of document (e.g., word document, email, presentation document, etc.), the topic of the document, the position of the user within an organization (e.g., the user's job title or department to which the user belongs, if known), and other non-linguistic features such as the time of the day, the date, the device used, the person to whom the document is directed (e.g., the to line in an email), and the like may be collected and used to provide better suggestions. The user specific information may be used, in one implementation, to provide customized suggestions for the user. For example, if it is determined that the user uses specific language when writing to a particular person, this information may be used to provide suggested replacement text segments the next time the user requests a suggestion when writing to the same person. It should be noted that in collecting and storing this information, care must be taken to ensure privacy is persevered, as discussed in more detail below.

Furthermore, to ensure compliance with ethical and privacy guidelines and regulations, in one implementation, an optional UI element may be provided to inform the user of the types of data collected, the purposes for which the data may be used and/or to allow the user to prevent the collection and storage of user related data. The UI may be accessible as part of features provided for customizing an application via a GUI displayed by the application when the user selects an options menu button. Alternatively, the information may be presented in a user agreement presented to the user when he/she first installs the application.

Figure 3A:
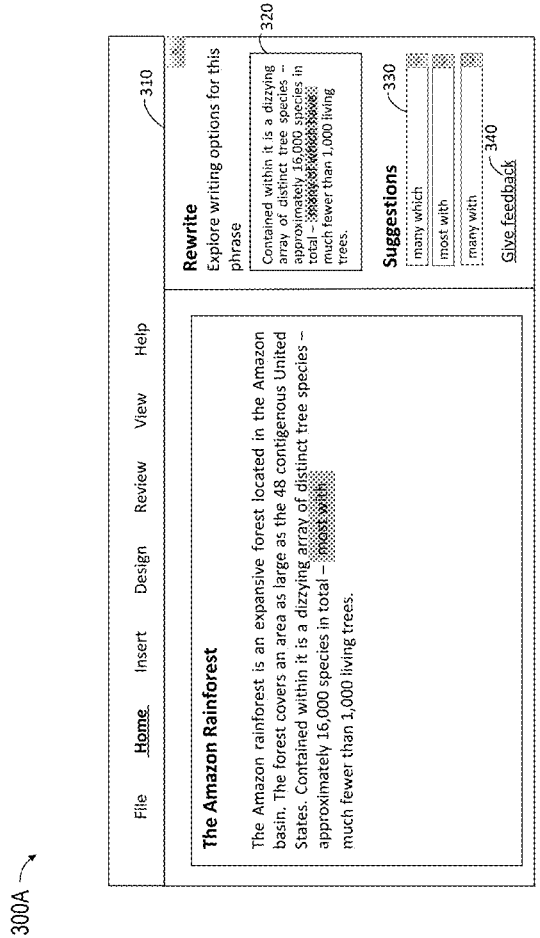
FIGS. 3A-3C are example GUI screens for allowing a user to provide feedback regarding the suggested replacement text segment provided for a selected text segment.
Figure 3B:
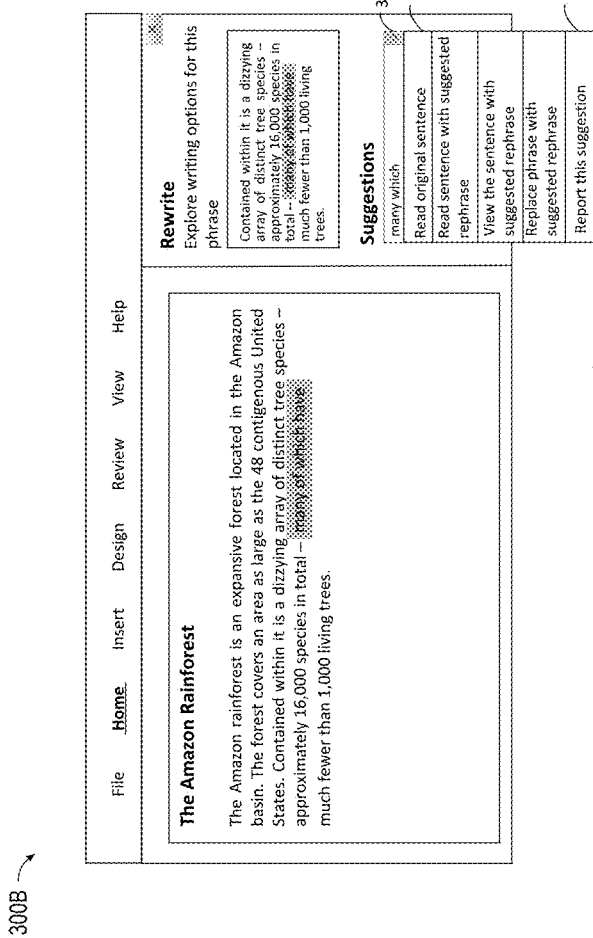
Figure 3C:
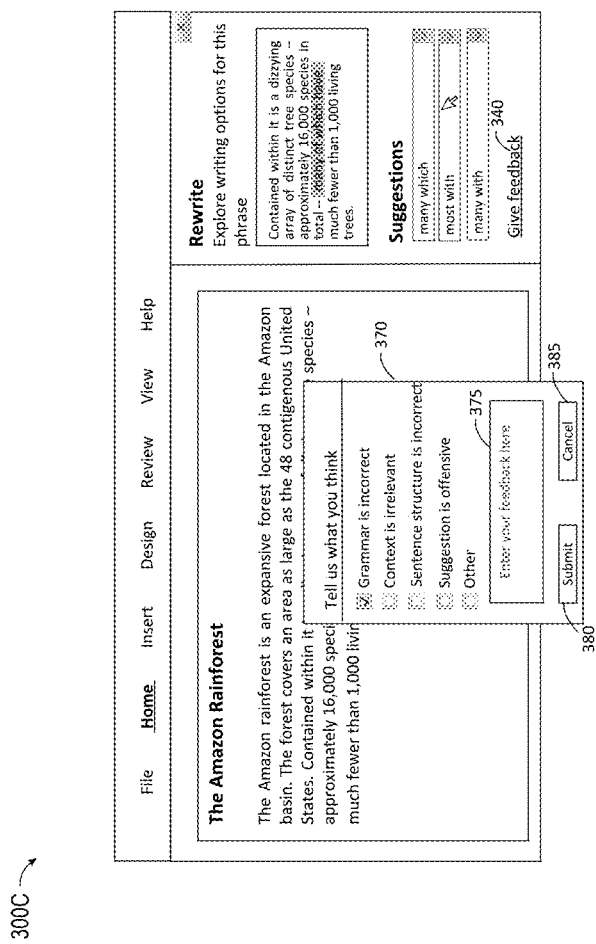

In addition to collecting information in the background as the user interacts with an application, the application may also provide options for directly providing user feedback. FIGS. 3A-3C are example GUI screens for allowing a user to provide feedback regarding the suggested replacement text segments provided for a selected text segment. FIG. 3A is an example GUI screen 300A of an application (e.g., Microsoft Word®) displaying an example document containing a selected text segment for which suggested replacement text segments are presented in a rewrite pane 310. In addition to the contents box 320 and the suggested replacement text segments 330, the GUI screen 300A may include a UI element 340 for enabling the user to provide feedback regarding the suggestions provided. In the example GUI screen 300A, the UI element 340 is a link, upon selection of which a separate UI element may be opened for enabling the user to provide feedback, as discussed further below.

Although, the UI element 340 is shown as a link, other types of UI elements may be utilized for enabling the user to provide feedback. For example, as shown in the GUI screen 300B of FIG. 3B, an option 360 may be provided as part of the dropdown menu 350 of a suggested replacement text segment 330 for providing feedback. Invoking the option 360 may cause a UI element to be displayed that would allow the user to provide feedback regarding the suggested replacement text segment 330. In an example, the UI element 340 of FIG. 3A may enable the user to provide feedback regarding all of the suggested replacement text segments provided, while the option 360 allows the user to provide feedback regarding the specific suggested replacement text segment for which the dropdown menu 350 is displayed. Many other UI configurations for enabling the user to provide feedback for the suggestions provided are contemplated. For example, various menu options may be provided for each of the suggested replacement text segments or the entirety of the suggestions to enable the user to provide feedback.

FIG. 3C is an example GUI screen 300C for displaying a UI element 370 that operates to receive feedback from the user regarding replacement text segment suggestions provided. In one implementation, the UI element 370 is a pop-up menu displayed, once the user selects a UI element such as UI element 340 of FIG. 3A or option 360 of FIG. 3B. The UI element 370 may include various selectable options (e.g., checkboxes) for enabling the user to provide feedback. For example, UI element 370 includes an option for indicating grammar is incorrect. This may be used by the user to indicate that use of the suggested replacement text segment would result in an incorrect grammar for the sentence. Another option provided by the UI element 370 may enable the user to indicate that the context of the provided suggestion(s) is irrelevant to the context of the document. Yet, another option may indicate that the sentence structure would be incorrect if the suggested replacement text segment is used and a different option may specify that the user finds the suggested replacement text segment offensive.

The UI element 370 may also provide a text input box 375 for receiving written comments from the user, in addition to having a submit button 380 for submitting the user's feedback and cancel button 390 for canceling the process of providing feedback. In this manner, the user may directly provide feedback regarding suggestions provided. In one implementation, this type of feedback may be sent to an organization that provides the rephrasing service, where a person may manually review the feedback to ensure its accuracy and applicability. If it is determined, based on predetermined guidelines of the organization providing the service, that the suggestions are in fact inappropriate, incorrect, irrelevant and/or offensive, steps may be taken to ensure they are not provided again in the future. For example, changes may be made to the trained ML model, a replacement text segment table used by the trained model and/or the dataset used for the training the model to ensure that the same suggestions will not be provided in the future. In one implementation, the process may include responding to the user. For example, when feedback relating to offensive content is received, a response may be provided to the user that ensures them their feedback was taken into account and appropriate action has been taken to address it.

It should be noted that although the current disclosure discusses written contents, the same methods and systems can be utilized to provide paraphrases for spoken words. For example, the methods discussed herein can be incorporated into or used with speech recognition algorithms to provide for replacement text segments of a spoken phrase. For example, when a speech recognition mechanism is used to convert spoken words to written words, the user may request that replacement text segments be suggested for a spoken phrase. The spoken phrase may then be converted to a text segment before the text segment is examined and processed to provide alternative paraphrases for the text segment. The identified suggestions may then be spoken to the user to allow the user to select one.

Figure 4:
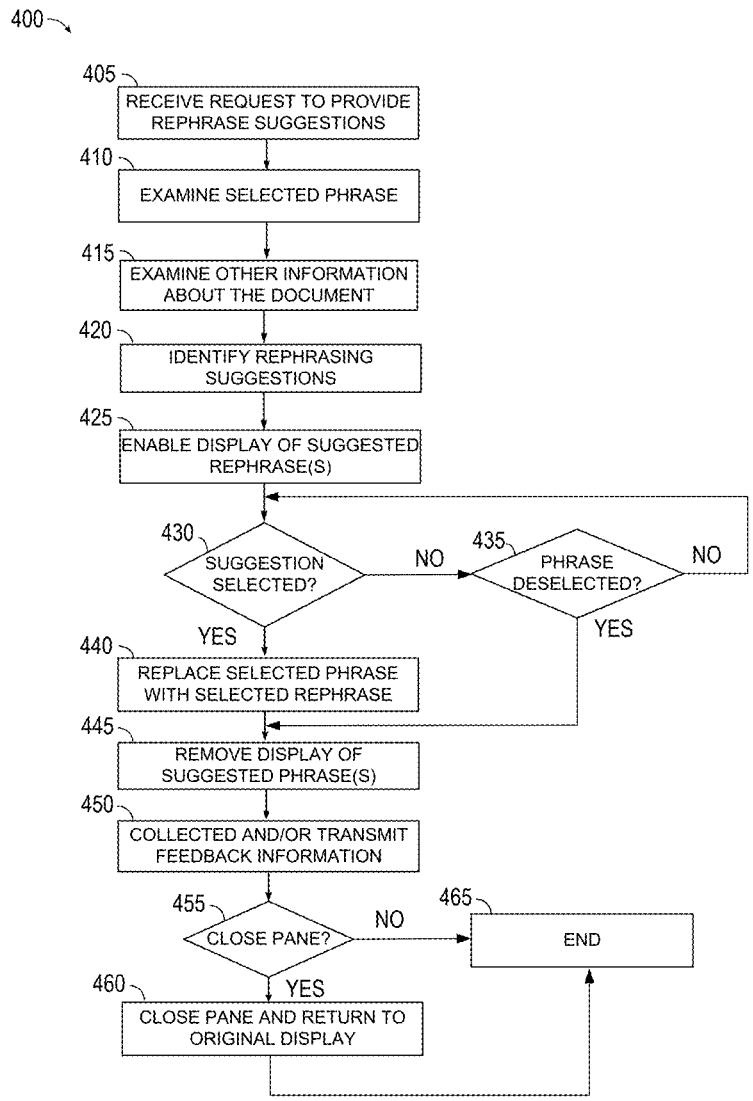
FIG. 4 is a flow diagram depicting an example method for providing intelligent replacement text segment suggestions for a selected text segment.

FIG. 4 is a flow diagram depicting an exemplary method 400 for providing intelligent rephrasing suggestions for a selected text segment. At 405, method 400 may begin by receiving a request to initiate providing replacement text segment suggestions. This may occur, for example, when the user utilizes an input/output device (e.g. a mouse) coupled to a computer client device to a select a text segment (e.g., a text string containing one or more words) in a document displayed by the client device and proceeds to invoke a UI element to request that suggestions for rephrasing the selected text segment be provided. In one implementation, a request may be received when a predetermined action takes place within the content pane (e.g., a special character is entered, or a predetermined keyboard shortcut is pressed) after a phrase within the contents has been selected.

Once a request to provide rephrasing suggestions has been received, method 400 may proceed to first examine the selected text segment, at 410. This may be done to determine whether the text segment is appropriate for rephrasing. For example, method 400 may first determine if the length of the selected text segment is appropriate for providing suggested replacement text segments. In an example, if the selected text segment is too long, an error message may be displayed on the display device notifying the user that suggestions cannot be provided for this text segment. In an implementation, an appropriate size for the selected text segment may be up to five words. Examining the selected text segment may also include determining if the selected text segment includes an identifiable word. This may include determining if the selected text segment includes words, numbers, and/or emoticons. For example, if the selected text segment consists of merely symbols (e.g., an equation), an error message may be provided indicating that the selected text segment is not appropriate for providing suggested replacement text segments. In an implementation, where one or more of the steps of method 400 are performed by a rephrasing service, the process of examining the selected text segment may first include receiving the selected text segment from the user's client device.

After examining the selected text segment, method 400 may collect and examine additional information about the document, at 415. This may be done by utilizing one or more text analytics algorithms that may examine the contents, context, formatting and/or other parameters of the document to identify the structure of the sentence containing the selected text segment, a style associated with the paragraph and/or the document, keywords associated with the document (e.g., the title of the document), the type of document, and the like.

The text analytics algorithms may include natural language processing algorithms that allow topic or keyword extractions, for example, in the areas of text classification and topic modeling. Examples of such algorithms include, but are not limited to, term frequency-inverse document frequency (TF-IDF) algorithms and latent Dirichlet allocation (LDA) algorithms. Topic modeling algorithms may examine the document to identify and extract salient words and items within the document that may be recognized as keywords. Keywords may then help determine the tone and type of document to help in determining the most appropriate replacement text segments. This is because different types of documents may use different terminology. For example, a scientific research article may need to use precise scientific terminology, while a poem may use allegories. Thus, by identifying and examining keywords, method 400 may determine the topic of the document, which in turn, may help determine the tone and style of the document.

The additional information that may be collected and examined may include non-linguistic features of the document, the application and/or the user. For example, for a document that is being prepared for being sent to a recipient, (e.g., an email, letter or instant message), the person to whom the document is being directed may determine the tone and style of the document. In an example, an email being sent to a person's manager may contain formal language, as opposed to an email that is being sent to a family member. Thus, the information contained in the to line of the email may affect the tone of the contents and as such may be taken into account in determining how to provide replacement text segments for a selected text segment. In another example, the time of the day an email is being sent or the day of the week may determine the tone of the contents. For example, emails being sent on the weekend or late at night may be personal emails (e.g., informal), while those sent during the business hours may be work-related emails. Other non-linguistic features that may be taken into account include the type of document attached to an email, or the types of pictures, tables, charts, icons or the like included in the contents of a document. Many other types of characteristics about the document or the user may be collected, transmitted (e.g., when a rephrasing service is being used), and examined in determining the best possible alternative expressions for a text segment.

In one implementation, machine learning algorithms may be used to examine activity history of the user within the document or within the user's use of the application to identify patterns in the user's usage. For example, the types of replacement text segment suggestions accepted by the user in a previous session of the document (or earlier in the current session) may be examined to identify patterns. In another example, suggested rephases that have already been provided and not approved in a prior session (or earlier in the current session) may be eliminated from the list of identified suggestions. This may be done during a prioritization and sorting process of identified suggestions. The history may be limited to the user's recent history (i.e., during a specific recent time period or during the current session) or may be for the entirety of the user's use of the application. This information may be stored locally and/or in the cloud. In one implementation, the history data may be stored locally temporarily and then transmitted in batches to a data store in the cloud which may store each user's data separately for an extended period of time or as long as the user continues using the application or as long as the user has granted permission for such storage and use.

In one implementation, replacement text segment suggestion history and data extracted from other users determined to be in a same category as the current user (e.g., in the same department, having the same job title, or being part of the same organization) may also being examined at this stage. Furthermore, method 400 may consult a global database of rephrasing history and document contents to identify global patterns. In one implementation, in consulting the global database, the method identifies and uses data for users that are in a similar category as the current user. For example, the method may use history data from users with similar activities, similar work functions and/or similar work products. The database consulted may be global but also local to the current device.

After examining the selected text segment and other information, a list of relevant suggested replacement text segments may be identified, at 420. In one implementation, identifying relevant suggested replacement text segments may be achieved by utilizing two or more different types of trained ML models. One type could be a personal model which is trained based on each user's personal information and another could be a global model that is trained based on examination of a global set of other users' information. A hybrid model may be used to examine users similar to the current user and to generate results based on activities of other users having similar characteristics (same organization, having same or similar job titles, creating similar types of documents, and the like) as the current user. For example, it may examine users that create similar artifacts as the current user or create documents having similar topics. As will be discussed further below, any of the models may collect and store what is suggested and record how the user interacts with the suggestions (e.g., which suggestions they approve). This ensures that every time a user interacts with the system, the models learn from the interaction to make the suggestions better. The different models may be made aware of each other, so that they each benefit from what the other models are identifying, while focusing on a specific aspect of the task.

It should be noted that the models examining the contents and identifying suggested replacement text segments may be hosted locally on the client (e.g., local rephrasing engine) or remotely in the cloud (e.g., rephrasing service). In one implementation, some models are hosted locally, while others are stored in the cloud. This enables the client to provide some suggestions even when the client is not connected to a network. For example, the client may be able to provide a list of rephrasing suggestions based on the current document and other local documents, but it may not be able to provide suggestions based on other users. Once the client connects to the network, however, the application may be able to provide better and more complete suggestions.

In one implementation, one or more of the models are created by first utilizing machine translation technology to generate a large text segment table (e.g., phrase table), and then using deep neural network techniques to generate the ML models that determine which rewrite alternatives are best in the context. This may be done by first using pre-neural machine translated text segment tables from multiple languages (e.g., 20 languages). In one implementation, heuristic weights for the tables may be replaced with similarity scores, and updated filters may be applied to remove offensive and non-inclusive language, sensitive terms (e.g., China is not the same Taiwan), and/or any private information (e.g., named entities, personal names, etc.). Next, annotation techniques may be used to evaluate usefulness of each candidate replacement text segment for a given original text segment in the table. This process may involve human evaluation of the text segments (e.g., using human judges) and may include thousands of original text segments and hundreds of thousands of candidate replacement text segments. These evaluations may help improve the text segment tables to ensure more appropriate suggestions are provided. The annotations may then be used in ranking metrics to determine how well the model may rank more relevant phrases higher and less relevant phrases lower. Thus, a neural network may be utilized as a language model in order to contextually rank the replacement text segments provided by the text segment table. Ranking metrics may then be used to reweight for scores provided by the text segment table and the language model.

In one implementation, the ranking metrics used may include metrics used for measuring search relevance. For example, the Normalized Discounted Cumulative Gain (NDCG) may be used to measure ranking quality of the annotations. As it is known in the art, NDCG can be used as a measure of ranking quality and is often used to measure effectiveness of web search engine algorithms. Use of such a ranking metric to evaluate text segment table annotations may provide a technical advantage in helping to expedite the ranking process. Other similar ranking metrics may also be used. Once the ranking measurement is complete, a deep neural network may be used to train a deep semantic similarity model by using the phrase tables as paraphrase datasets. The use of a deep semantic similarity model is advantageous as such models require relatively quick training and inference time and the model is trained to output a score that directly reflects the relationship between pairs of phrases.

In one implementation, direct phrase embeddings may also be used to learn a representation of textual segments directly to improve the quality of the models. In one approach, adaptive mixture of word representations may be used instead of averaging, and scores may be optimized on manually annotated textual similarity sets. In another approach, phrase skip-gram models may be trained to predict context words given a text segment. Additionally, representations of a text segment may be computed with neural models such as convolutional or recurrent neural networks.

In one implementation, the replacement text segments may be generated by a statistical machine translation system that is trained on data comprising aligned texts that are rephrasing of the text. These data may be compiled from naturally-occurring paraphrases, hand-authored rewrites for style and content, before and after editing data, paraphrases generated by round-tripping translations, and any other means of synthesizing texts in which semantic equivalence is preserved. The statistical machine translation system may use a conventional statistical language model or a neural language model. Training data may be selected for specific features such as style and relative length.

In one implementation, the replacement text segments may be generated by a machine translation model that is a neural network. This may be in the form of a sequence-to-sequence mapping model, using a long short-term memory model, a transformer model, or any other neural model that is appropriate to the task. The training data may be compiled from naturally-occurring paraphrases, hand-authored rewrites for style and content, before and after editing data, paraphrases generated by round-tripping translations, and any other means of synthesizing texts in which semantic equivalence is preserved. Training data may be selected for specific features such as style and relative length. The neural model may use various forms of multi-task and transfer learning from non-parallel data to achieve the desired characteristics of the replacement text.

Referring back to FIG. 4, one or more of these models are used to identify one or more replacement text segment suggestions for a given text segment, before method 400 enables display of the identified suggestions, at 425. Enabling the display may include transmitting the identified suggestions to the local application running on the user's client device which may utilize one or more UI elements such as those discussed above to display the suggested replacement text segments on a display device associated with the client device. The format in which the suggestions are displayed may vary. However, in most cases, the suggestions may be displayed alongside the contents to enable easy reference to the contents.

Once the suggestions are displayed, method 400 may determine if one of the suggestions is selected for replacing the original selected text segment, at 430. When it is determined that none of the suggestions have been selected, method 400 may proceed to determine if the given text segment was deselected, at 435. This may indicate that the user did not approve of any of the suggested replacement text segments and chose to keep the original text segment instead. Thus, when it is determined that the user did indeed deselect the original text segment, at 435, method 400 may proceed to step 445, as discussed further below. If, however, it is determined that the original text segment was not deselected, method 400 may return to step 430 to determine if a selection of the one or more rephrasing suggestions has been made. Thus, method 400 may wait until either a selection is made or the original text segment is deselected. Additionally, other scenarios such as the suggestions pane being closed, or the document being closed may cause method 400 to end.

When it is determined, at 430, that a suggested replacement text segment is selected, method 400 may proceed to replace the original text segment with the selected replacement text segment, at 440. This may involve replacing the text segment in the contents of the document that was originally selected for rephrasing with the selected suggestion. After replacing the given text segment with the suggestion, method 400 may proceed to remove the list of suggestions from the UI element used to display them, at 445, before proceeding to collect information regarding the user's interaction with the suggestions for storage and/or transmission to the rephrasing service for use in further training of the rephrasing model(s), at 450. In one implementation, the information may include not only which one of the suggested replacement text segments were selected, but also the context of the original sentence, contents, and/or other information about the document or user, as discussed above. Information that is user specific may be stored in a user-specific data store to be used in a customized model used for the user. The information may also be transmitted and stored in a global datastore used for training the global rephrasing models.

Because contextual information (e.g., surrounding words) and user specific information may need to be collected in order to provide a context for learning and since this information and all other linguistic features may contain sensitive and private information, compliance with privacy and ethical guidelines and regulations is important. Thus, the collection and storage of user feedback may need to be protected against both maleficent attackers who might expose private data and accidental leakage by suggestions made to other users having learned from the data. As such, during the process of collecting and transmitting feedback information, the information may be anonymized and encrypted, such that any user-specific information is removed or encrypted to ensure privacy.

In one implementation, where user-specific information is used to provide customized rephrasing suggestions, any private user-specific information may be stored locally. In another example, information about users within an organization may be stored with the network of the organization. In such instances, information relating to institutional users may be collected and stored in compliance with the organization's own policies and standards to permit the development of organizational learning models. However, even within organizational networks, privacy may often need to be maintained to prevent unauthorized leakage of organizational secrets within the organization.

Other steps may be taken to ensure that the information collected does not contain sensitive or confidential personal or organizational information. This is particularly important since information gathered from a document may be used to provide suggestions for global users and as such it is possible that a person's or organization's internal trade secrets or other highly sensitive information may be inadvertently leaked. In one implementation, the results of user feedback may be compared against a very large language model (e.g., a neural embedding model) and the information may be stored as an encrypted embedding along with frequency information. The learned model may then be updated periodically with this stored information to improve learning. In an example, differential privacy techniques may be utilized to ensure compliance with privacy. In another example, homomorphic encryption may be used. Other approaches may involve use of horizontal federated learning, vertical federated learning, or federated transfer learning which allow different degrees of crossover among domains without leakage. These approaches are discussed by QIANG YANG et al. 2019. Federated Machine Learning: Concept and Applications. https://arxiv.org/pdf/1902.04885.pdf, which is incorporated herein in its entirety.

Once user feedback is collected, transmitted, and/or stored, method 400 may proceed to determine whether a request to close the suggestion's pane has been received, at 455. When it is determined that a request to close the pane has been received, method 400 may proceed to close the pane and return to the original display (e.g., having the contents pane occupy most of the UI) before the request to receive rephrasing suggestions was received, at 460. If it is determined that a request for closing the pane has not been received or after the pane has been closed and the original display returned, method 400 may proceed to end, at 465.

Thus, methods and systems for providing intelligent replacement text segment suggestions for a selected text segment are disclosed. The methods may utilize one or more machine-trained models developed for identifying relevant replacement text segments for a given text segment based on multiple factors including the context of a given text segment. The suggestions may then be displayed on the same UI screen as the document contents to enable the user to quickly and efficiently approve the most appropriate suggested replacement text segment for the selected text segment. This provides an easy and efficient technical solution for enabling users to replace a given text segment in their documents. This can improve the user's overall experience and increase their efficiency and proficiency when writing and/or speaking.

Figure 5:
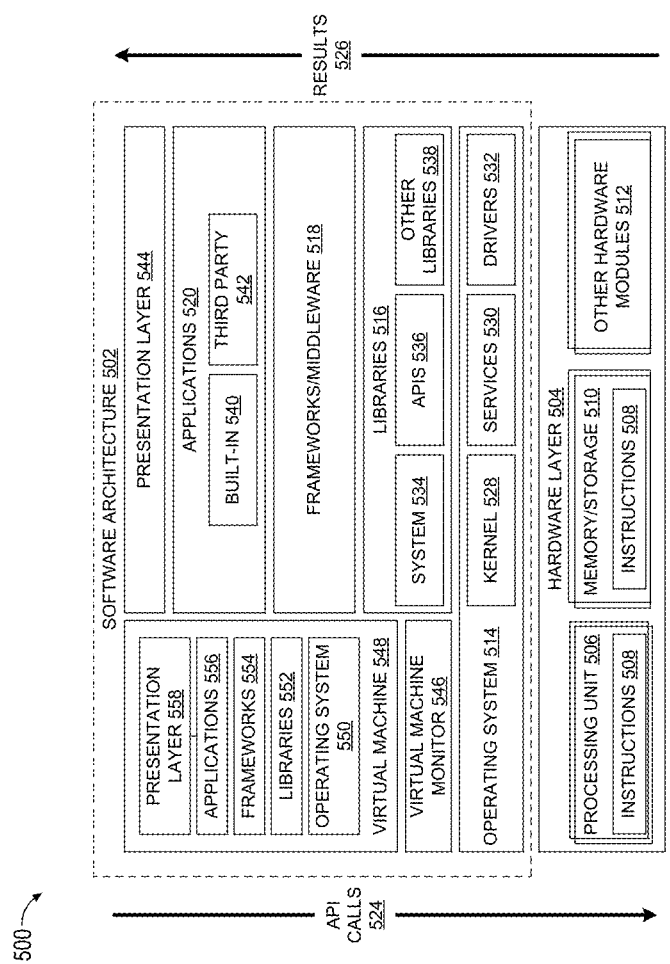
FIG. 5 is a block diagram illustrating an example software architecture, various portions of which may be used in conjunction with various hardware architectures herein described.

FIG. 5 is a block diagram 500 illustrating an example software architecture 502, various portions of which may be used in conjunction with various hardware architectures herein described, which may implement any of the above-described features. FIG. 5 is a non-limiting example of a software architecture and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 508 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 524. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 520 and/or third-party applications 522. Examples of built-in applications 520 may include, but are not limited to, a contacts application, a browser application, a location application, a media application, a messaging application, and/or a game application. Third-party applications 522 may include any applications developed by an entity other than the vendor of the particular system. The applications 520 may use functions available via OS 514, libraries 516, frameworks 518, and presentation layer 524 to create user interfaces to interact with users.

Some software architectures use virtual machines, as illustrated by a virtual machine 528. The virtual machine 528 provides an execution environment where applications/modules can execute as if they were executing on a hardware machine (such as the machine 600 of FIG. 6, for example). The virtual machine 528 may be hosted by a host OS (for example, OS 514) or hypervisor, and may have a virtual machine monitor 526 which manages operation of the virtual machine 528 and interoperation with the host operating system. A software architecture, which may be different from software architecture 502 outside of the virtual machine, executes within the virtual machine 528 such as an OS 550, libraries 552, frameworks 554, applications 556, and/or a presentation layer 558.

Figure 6:
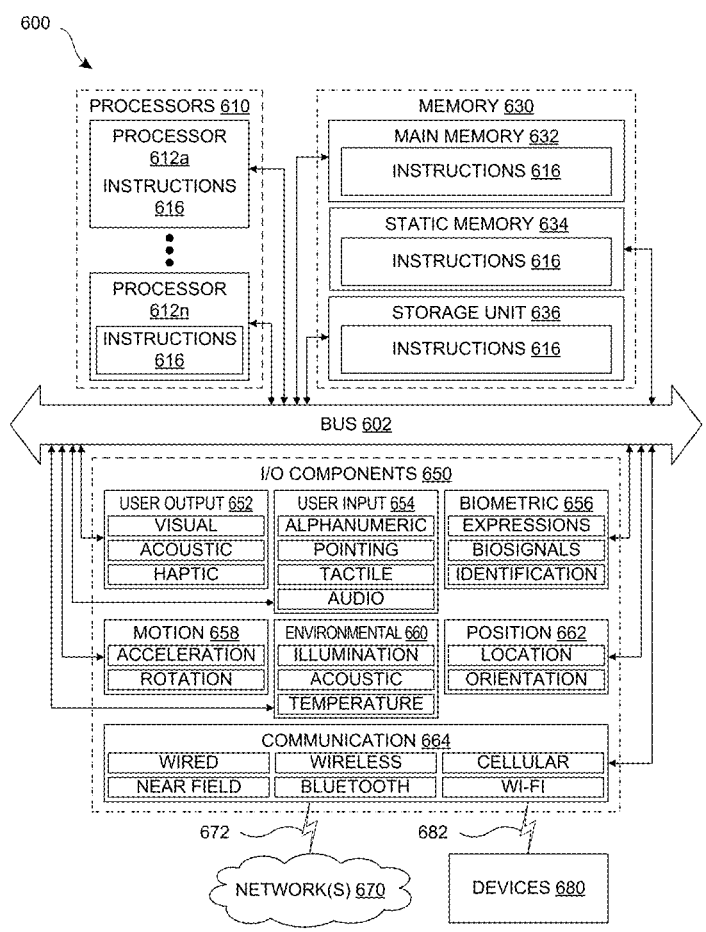
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers).

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 662, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-4) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a memory in communication with the processor, the memory comprising executable instructions that, when executed by, the processor, cause the data processing system to perform functions of:
   receiving a request to provide a replacement text segment for a text segment in a document;
   upon receiving the request, examining a content characteristic of the document;
   examining a user-specific activity history;
   identifying at least one replacement text segment for the text segment, via a machine translation system, based on the content characteristic of the document and the user-specific activity history;
   providing the identified at least one replacement text segment for display to a user;
   receiving an input indicating a user's selection of the identified at least one replacement text segment; and
   upon receiving the input, replacing the text segment in the document with the identified at least one replacement text segment.

2. The data processing system of claim 1, wherein the instructions further cause the processor to cause the data processing system to perform functions of:
   collecting user feedback information relating to the user's selection of the replacement text segment;
   ensuring that the feedback information is privacy compliant; and
   storing the feedback information for use in improving the machine translation system.

3. The data processing system of claim 1, wherein providing the identified at least one replacement text segment for display to the user includes displaying the identified replacement text segment on a user interface element relating to the document.

4. The data processing system of claim 3, wherein displaying the identified at least one replacement text segment on the user interface element comprises displaying the identified replacement text segment alongside the content of the document.

5. The data processing system of claim 1, wherein the instructions further cause the processor to cause the data processing system to perform functions of
receiving feedback regarding the identified at least one replacement text segment from the user;
examining the feedback to determine its relevancy; and
modifying the machine translation system based on the received feedback.

6. The data processing system of claim 1, wherein the machine translation system is a statistical machine translation system.

7. The data processing system of claim 6, wherein the machine translation system is trained using a dataset compiled from one or more of naturally-occurring, hand-edited, or synthetic text data.

8. A method for providing replacement text segment suggestions for a text segment in a document, comprising:
receiving a request to provide the replacement text segment for the text segment in the document;
examining a content characteristic of the document;
examining a user-specific activity history;
identifying at least one replacement text segment for the text segment, via a machine translation system, based on the content characteristic of the document and the user-specific activity history;
providing the identified at least one replacement text segment for display to a user;
receiving an input indicating a user's selection of the identified at least one replacement text segment; and
upon receiving the input, replacing the text segment in the document with the identified at least one replacement text segment.

9. The method of claim 8, further comprising:
collecting user feedback information relating to the user's selection of the identified at least one replacement text segment;
ensuring that the feedback information is privacy compliant; and
storing the feedback information for use in improving a machine-trained model.

10. The method of claim 8, wherein providing the identified at least one replacement text segment for display to the user includes displaying the identified replacement text segment on a user interface element relating to the document.

11. The method of claim 10, wherein displaying the identified at least one replacement text segment on the user interface element comprises displaying the identified replacement text segment alongside the content of the document.

12. The method of claim 8, further comprising:
receiving feedback regarding the identified at least one replacement text segment from the user;
examining the feedback to determine its relevancy; and
modifying the machine translation system based on the received feedback.

13. The method of claim 8, wherein the machine translation system is a statistical machine translation system.

14. The method of claim 13, wherein the machine translation system is trained using a dataset compiled from one or more of naturally-occurring, hand-edited, or synthetic text data.

15. A non-transitory computer readable medium on which are stored instructions that, when executed, cause a programmable device to:
receive a request to provide a replacement text segment for a text segment in a document;
examine a content characteristic of the document;
examine a user-specific activity history;
identify at least one replacement text segment for the text segment, via a machine translation system, based on the content characteristic of the document and the user-specific activity history;
provide the identified at least one replacement text segment for display to a user;
receive an input indicating a user's selection of the identified at least one replacement text segment; and
upon receiving the input, replace the text segment in the document with the identified at least one replacement text segment.

16. The non-transitory computer readable medium of claim 15, wherein the instructions further cause the programmable device to:
collect user feedback information relating to the user's selection of the identified at least one replacement text segment;
ensue that the feedback information is privacy compliant; and
store the feedback information for use in improving the machine translation system.

17. The non-transitory computer readable medium of claim 15, wherein providing the identified replacement text segment for display to the user includes displaying the identified at least one replacement text segment on a user interface element relating to the document.

18. The non-transitory computer readable medium of claim 15, wherein the instructions further cause the programmable device to:
receive feedback regarding the identified at least one replacement text segment from the user;
examine the feedback to determine its relevancy; and
modify the machine translation system based on the received feedback.

19. The non-transitory computer readable medium of claim 15, wherein the machine translation system is a statistical machine translation system.

20. The non-transitory computer readable medium of claim 19, wherein the machine translation system is trained using a dataset compiled from one or more of naturally-occurring, hand-edited, or synthetic text data.

* * * * *